US012694085B2

(12) United States Patent
Chang et al.

(10) Patent No.: US 12,694,085 B2
(45) Date of Patent: Jul. 28, 2026

(54) ELECTRONIC DEVICE FOR PERFORMING AUTHENTICATION BY USING BIOMETRIC DATA OF USER, AND METHOD THEREFOR

(71) Applicant: Samsung Electronics Co., Ltd., Suwon-si (KR)

(72) Inventors: Moonsoo Chang, Suwon-si (KR); Yangsoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 215 days.

(21) Appl. No.: 18/471,762

(22) Filed: Sep. 21, 2023

(65) Prior Publication Data

US 2024/0012892 A1 Jan. 11, 2024

Related U.S. Application Data

(63) Continuation of application No. PCT/KR2022/001373, filed on Jan. 26, 2022.

(30) Foreign Application Priority Data

Apr. 20, 2021 (KR) ........................ 10-2021-0051231
Aug. 19, 2021 (KR) ........................ 10-2021-0109305

(51) Int. Cl.
*G06F 21/32* (2013.01)
*G06V 40/70* (2022.01)

(52) U.S. Cl.
CPC .............. *G06F 21/32* (2013.01); *G06V 40/70* (2022.01)

(58) Field of Classification Search
CPC ................................ G06F 21/32; G06V 40/70
(Continued)

(56) References Cited

U.S. PATENT DOCUMENTS 10,108,792 B2 10/2018 Hou et al.
10,305,895 B2 * 5/2019 Barry ..................... G07C 9/257
(Continued)

FOREIGN PATENT DOCUMENTS

CN 104156751 A 11/2014
CN 119272257 A * 1/2015 ........... G06V 10/806
(Continued)

OTHER PUBLICATIONS

International Search Report with Written Opinion and English translation dated May 10, 2022; International Appln. No. PCT/KR2022/001373.

(Continued)

*Primary Examiner* — Tauqir Hussain
(74) *Attorney, Agent, or Firm* — Jefferson IP Law, LLP

(57) ABSTRACT

An electronic device is provided. The electronic device includes a sensor module, a communication module, and a processor, which receives biometric data of a user by using the sensor module, processes the received biometric data of the user to generate first data, processes the received biometric data of the user to generate second data, controls the communication module to transmit, to a server, an authentication request message including the generated first data, controls the communication module to receive, from the server, a response message including an authentication result of the transmitted first data, and combines the generated second data and the received authentication result and store same, wherein the first data and the second data can be data generated by applying different algorithms.

11 Claims, 7 Drawing Sheets

(58) Field of Classification Search
USPC ........................................................ 713/186
See application file for complete search history.

(56) References Cited

U.S. PATENT DOCUMENTS

| | | | |
|---|---|---|---|
| 10,387,637 B2 | 8/2019 | Scully-Power et al. | |
| 10,887,109 B2 | 1/2021 | Chang et al. | |
| 11,127,010 B2 | 9/2021 | Cho et al. | |
| 11,341,224 B2 * | 5/2022 | Bolme ................... | G06V 40/50 |
| 11,405,386 B2 | 8/2022 | Chang et al. | |
| 11,822,633 B1 * | 11/2023 | Desai ..................... | G06V 40/20 |
| 11,829,460 B2 * | 11/2023 | Vargas ................... | G06V 40/70 |
| 12,231,540 B2 * | 2/2025 | Lee .......................... | H04L 9/085 |
| 2010/0049659 A1 * | 2/2010 | Cassone ................. | G06F 21/32 |
| | | | 705/64 |
| 2011/0037563 A1 | 2/2011 | Choi et al. | |
| 2011/0285504 A1 | 11/2011 | Puerto et al. | |
| 2012/0087549 A1 | 4/2012 | Benini | |
| 2012/0230555 A1 | 9/2012 | Miura et al. | |
| 2014/0157384 A1 * | 6/2014 | Stern ................... | H04L 63/0861 |
| | | | 726/7 |
| 2016/0337322 A1 * | 11/2016 | Kang ...................... | H04L 63/08 |
| 2017/0142589 A1 * | 5/2017 | Park ................... | H04L 63/0861 |
| 2018/0109947 A1 * | 4/2018 | Kim ................... | H04W 12/041 |
| 2018/0173863 A1 * | 6/2018 | Andersson ............. | G06V 40/70 |
| 2019/0012450 A1 * | 1/2019 | Hou ......................... | G06F 21/32 |
| 2019/0058596 A1 * | 2/2019 | Chang ................. | H04L 9/3247 |
| 2019/0197226 A1 | 6/2019 | Hu et al. | |
| 2019/0372969 A1 * | 12/2019 | Chang .................... | G06V 40/18 |
| 2020/0252217 A1 * | 8/2020 | Mathieu ............... | H04L 9/3231 |
| 2020/0266992 A1 | 8/2020 | Kim et al. | |
| 2020/0358611 A1 * | 11/2020 | Hoang .................. | H04L 9/3231 |
| 2022/0382839 A1 * | 12/2022 | Vargas .................... | G06N 3/04 |
| 2025/0173414 A1 * | 5/2025 | Tussy ................. | G06Q 20/3276 |

FOREIGN PATENT DOCUMENTS

| | | | | | |
|---|---|---|---|---|---|
| CN | 102970411 | B | 6/2018 | | |
| CN | 109409245 | A | 3/2019 | | |
| CN | 111984956 | B * | 2/2025 | ....... | G06Q 20/40145 |
| JP | 2015-022593 | A | 2/2015 | | |
| KR | 20-0294409 | Y1 | 11/2002 | | |
| KR | 10-1226151 | B1 | 1/2013 | | |
| KR | 10-1453908 | B1 | 10/2014 | | |
| KR | 10-2014-0138991 | A | 12/2014 | | |
| KR | 10-1546606 | B1 | 8/2015 | | |
| KR | 10-1710794 | B1 | 2/2017 | | |
| KR | 10-2019-0128478 | A | 11/2019 | | |
| KR | 10-2020-0099290 | A | 8/2020 | | |
| WO | WO-2018117940 | A1 * | 6/2018 | ............. | G06F 21/40 |
| WO | WO-2018126177 | A1 * | 7/2018 | ........... | H04L 9/3231 |

OTHER PUBLICATIONS

Korean Office Action dated Jan. 29, 2026, issued in Korean Application No. 10-2021-0109305.

* cited by examiner

Figure 6:
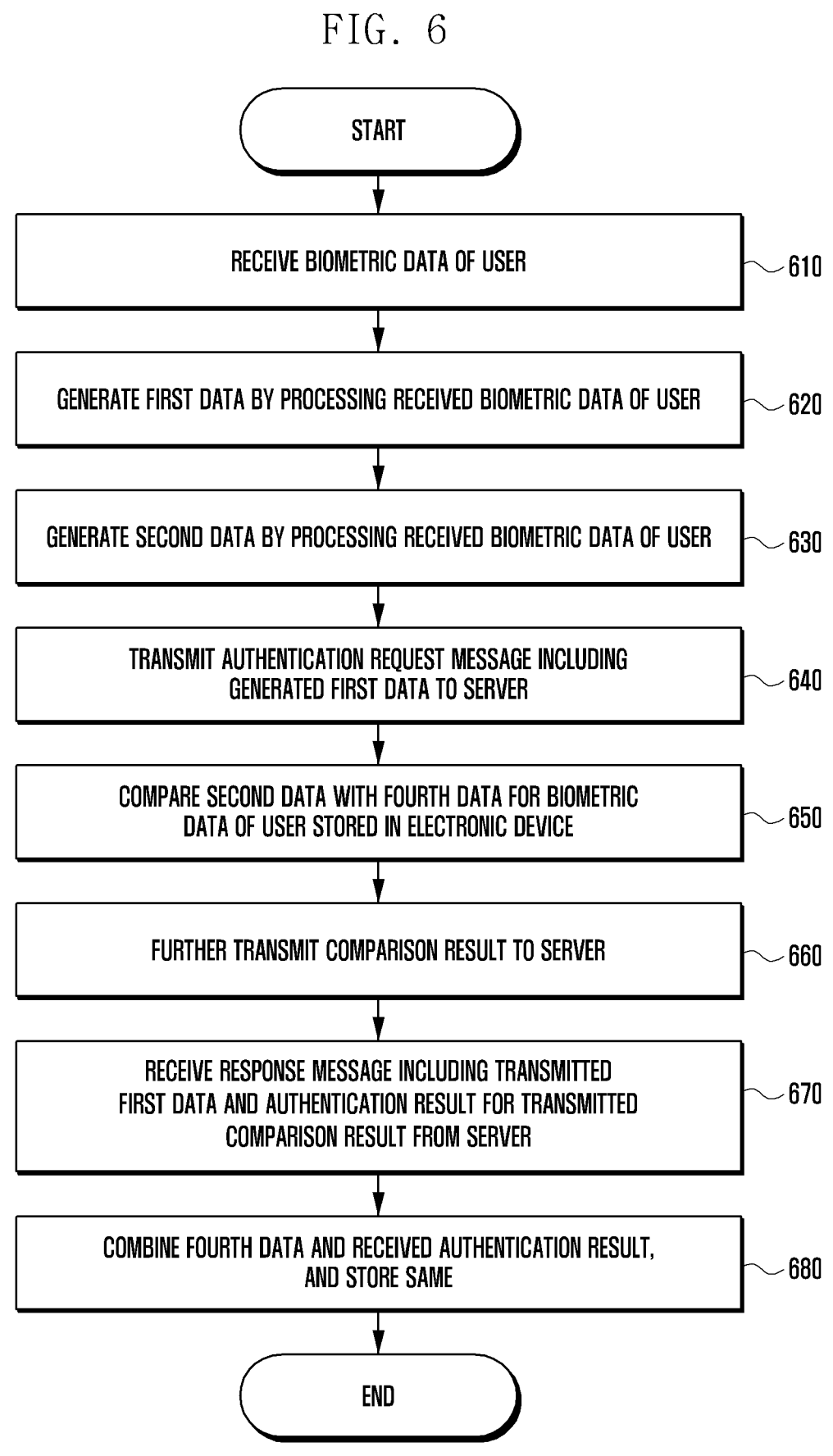

START

RECEIVE BIOMETRIC DATA OF USER ~ 610

GENERATE FIRST DATA BY PROCESSING RECEIVED BIOMETRIC DATA OF USER ~ 620

GENERATE SECOND DATA BY PROCESSING RECEIVED BIOMETRIC DATA OF USER ~ 630

TRANSMIT AUTHENTICATION REQUEST MESSAGE INCLUDING GENERATED FIRST DATA TO SERVER ~ 640

COMPARE SECOND DATA WITH FOURTH DATA FOR BIOMETRIC DATA OF USER STORED IN ELECTRONIC DEVICE ~ 650

FURTHER TRANSMIT COMPARISON RESULT TO SERVER ~ 660

RECEIVE RESPONSE MESSAGE INCLUDING TRANSMITTED FIRST DATA AND AUTHENTICATION RESULT FOR TRANSMITTED COMPARISON RESULT FROM SERVER ~ 670

COMBINE FOURTH DATA AND RECEIVED AUTHENTICATION RESULT, AND STORE SAME ~ 680

END

ELECTRONIC DEVICE FOR PERFORMING AUTHENTICATION BY USING BIOMETRIC DATA OF USER, AND METHOD THEREFOR

CROSS-REFERENCE TO RELATED APPLICATION(S)

This application is a continuation application, claiming priority under § 365(c), of an International application No. PCT/KR2022/001373, filed on Jan. 26, 2022, which is based on and claims the benefit of a Korean patent application number 10-2021-0051231, filed on Apr. 20, 2021, in the Korean Intellectual Property Office, and of a Korean patent application number 10-2021-0109305, filed on Aug. 19, 2021, in the Korean Intellectual Property Office, the disclosure of each of which is incorporated by reference herein in its entirety.

BACKGROUND

1. Field

The disclosure relates to an electronic device and method for performing authentication by using biometric data of a user.

2. Description of Related Art

Data that may be extracted from a user's body is diversifying, and technologies that utilize the data are developing. One of them is biometric recognition technology, which refers to a technology that extracts signals or data related to a living body from a user, compares the data with previously stored data, verifies identity and authenticates as a user. The signals or data related to a living body used in the biometric recognition technology include a fingerprint, an iris, a face, an electrocardiogram, a retinal pattern, a palm, and a vein pattern.

Because the biometric recognition technology individual unique biometric signals, there is no fear of theft or loss, and it is difficult to counterfeit or falsify, so it is in the spotlight in the security field.

The above information is presented as background information only to assist with an understanding of the disclosure. No determination has been made, and no assertion is made, as to whether any of the above might be applicable as prior art with regard to the disclosure.

SUMMARY

One of the methods for authenticating the owner of the electronic device may be a method using information stored in the electronic device. For example, when a password stored in the electronic device is input, the electronic device may recognize that the owner of the electronic device wants to use the electronic device. However, the user of the electronic device and the owner of the electronic device may not match because the password may be leaked out or the owner of the electronic device may lend the electronic device to another person. If the user of the electronic device and the owner of the electronic device do not match, a problem may occur when the user must be specified using the electronic device, for example, when trying to store and use a mobile identification (ID) in the electronic device.

Aspects of the disclosure are to address at least the above-mentioned problems and/or disadvantages and to provide at least the advantages described below. Accordingly, an aspect of the disclosure is to provide an electronic device and method for performing authentication by using biometric data of a user.

Additional aspects will be set forth in part in the description which follows and, in part, will be apparent from the description, or may be learned by practice of the presented embodiments.

In accordance with an aspect of the disclosure, an electronic device is provided. The electronic device includes a sensor, a communication circuit, and at least one processor, which receives biometric data of a user by using the sensor, processes the received biometric data of the user to generate first data, processes the received biometric data of the user to generate second data, controls the communication circuit to transmit, to a server, an authentication request message including the generated first data, controls the communication circuit to receive, from the server, a response message including an authentication result of the transmitted first data, and combines the generated second data and the received authentication result and store same, wherein the first data and the second data can be data generated by applying different algorithms.

In accordance with another aspect of the disclosure, a server is provided. The server includes a communication circuit, and at least one processor configured to control the communication circuit to receive, from an electronic device, an authentication request message comprising first data in which biometric data of a user is processed, compare second data in which biometric data of a user is processed by a server with the first data and control the communication circuit to transmit, to the electronic device, a response message comprising an authentication result based on the comparison result.

In accordance with another aspect of the disclosure, an operation method of an electronic device is provided. The operation method includes receiving biometric data of a user, processing the received biometric data of the user to generate first data, processing the received biometric data of the user to generate second data, transmitting an authentication request message comprising the generated first data to a server, receiving a response message comprising an authentication result for the transmitted first data from the server, combining the generated second data and the received authentication result and storing the same, wherein the first data and the second data are data generated by applying different algorithms.

In accordance with another aspect of the disclosure, an operation method of a server is provided. The operation method includes receiving an authentication request message comprising first data in which biometric data of a user is processed from an electronic device, comparing second data in which biometric data of a user is processed by a server with the first data and transmitting a response message comprising an authentication result based on the comparison result to the electronic device.

According to various embodiments of the disclosure, a mobile ID may be linked to an unlock function of an electronic device. As the unlock function of the electronic device is linked to the mobile ID card, security of the electronic device may be strengthened.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a block diagram illustrating an example electronic device in a network environment according to an embodiment of the disclosure;

FIG. 5 is a block diagram of a system including an electronic device and a server according to an embodiment of the disclosure;

FIG. 6 is a flowchart of an electronic device according to an embodiment of the disclosure.

Throughout the drawings, it should be noted that like reference numbers are used to depict the same or similar elements, features, and structures.

DETAILED DESCRIPTION

Figure 2:
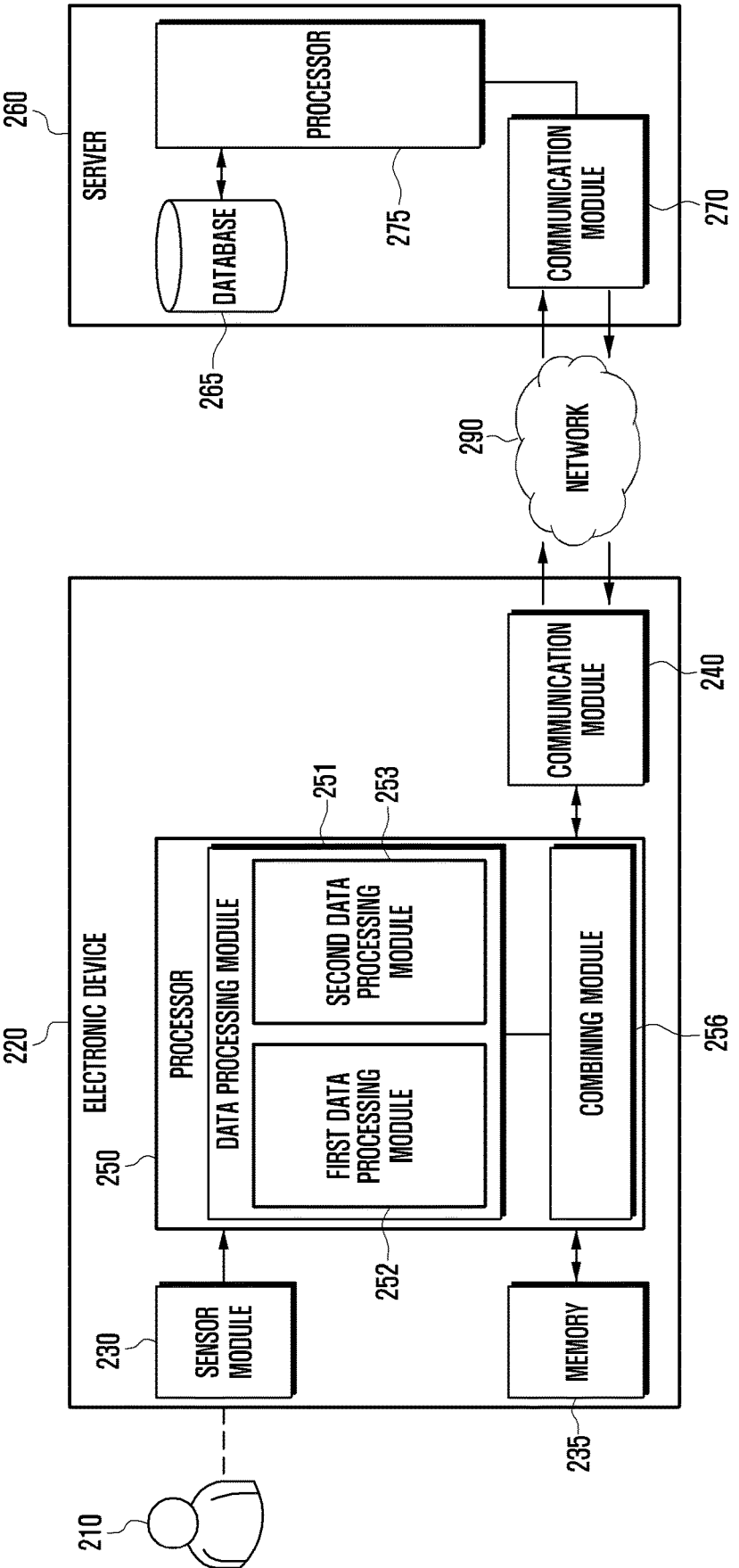
FIG. 2 is a block diagram of a system including an electronic device and a server according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
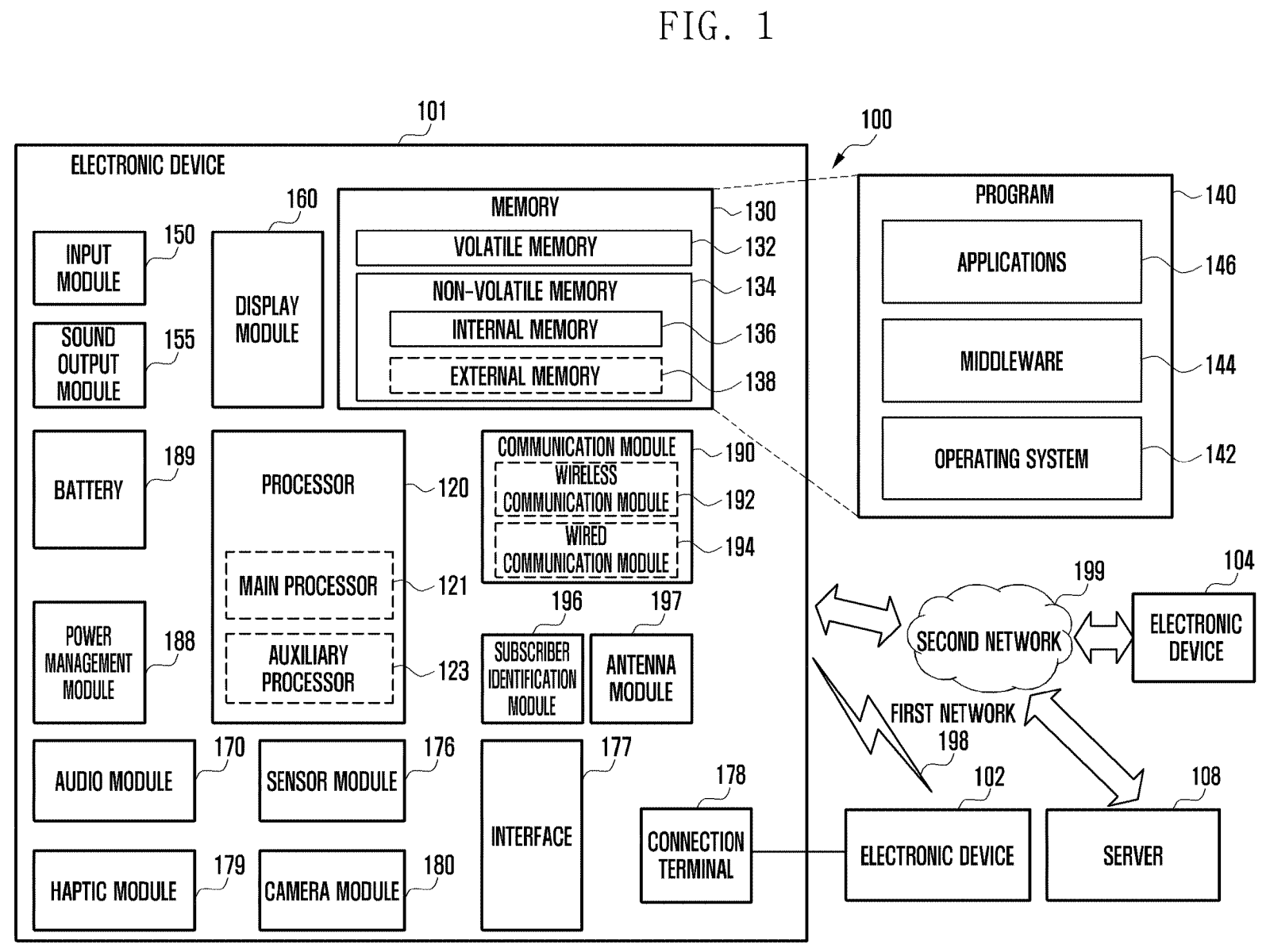

FIG. 1 is a block diagram illustrating an example electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to another embodiment, the electronic device 101 may communicate with the electronic device 104 via the server 108. According to yet another embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one (e.g., the display module 160 or the camera module 180) of the components may be omitted from the electronic device 101, or one or more other components may be added in the electronic device 101. In some embodiments, some of the components may be implemented as single integrated circuitry.

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to a further embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to still another embodiment, the auxiliary processor 123 (e.g., an image signal processor or a communication processor) may be implemented as part of another component (e.g., the camera module 180 or the communication module 190) functionally related to the auxiliary processor 123. According to another embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to yet another embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to a further embodiment, the display module 160 may include a touch sensor adapted to detect a touch, or a pressure sensor adapted to measure the intensity of force incurred by the touch.

The audio module 170 may convert a sound into an electrical signal and vice versa. According to still another embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to another embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to yet another embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to a further embodiment, the haptic module 179 may include, for example, a motor, a piezoelectric element, or an electric stimulator.

The camera module 180 may capture a still image or moving images. According to still another embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to yet another embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to a further embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to another embodiment, another component (e.g., a radio frequency integrated circuit (RFIC)) other than the radiating element may be additionally formed as part of the antenna module 197.

According to various embodiments, the antenna module 197 may form a mmWave antenna module. According to yet another embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to a further embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to still another embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2 is a block diagram of a system including an electronic device and a server according to an embodiment of the disclosure.

Referring to FIG. 2, the system may include an electronic device 220 (e.g., the electronic device 101 of FIG. 1) and a server 260 (e.g., the server 108 of FIG. 2) connected to the electronic device 220 through a network 290. The server 260 is an electronic device of a user authentication authority (e.g., a user ID card issuing authority) and may authenticate biometric data of a user transmitted from the electronic device 220.

Referring to FIG. 2, the electronic device 220 (e.g., the electronic device 101 of FIG. 1) may include at least some of a sensor module 230 (e.g., the sensor module 176 of FIG. 1), a memory 235 (e.g., the memory 130 of FIG. 1), a communication module 240 (e.g., the communication module 190 of FIG. 1), and a processor 250 (e.g., the processor 120 of FIG. 1).

According to various embodiments, the sensor module 230 for obtaining biometric data from a user 210 may include at least some of a camera, an infrared sensor, and a fingerprint recognition sensor. The sensor module 230 may be used to convert the unique characteristics of a user's body into biometric data. According to another embodiment, a plurality of biometric data of a user may be obtained by a single sensor. For example, a camera (not illustrated) may be used to obtain an image of a user's body (face, palm pattern), and an infrared sensor may be used to obtain iris and blood vessel data. According to yet another embodiment, a piece of biometric data of a user may be obtained in various ways by using various sensors. For example, fingerprints may be obtained by using a camera, or obtained by converting the curvature of the fingerprint measured by using capacitance into an image. In addition, biometric data of the user may be obtained from the finger, face, electrocardiogram, retina, blood vessels, and/or palm through the sensor module 230.

According to various embodiments, the memory 235 may store various data used by at least one component of the electronic device 220. For example, biometric data of the user received from the sensor module 230, the authentication result received from the server 260, and biometric data of the user processed by the processor 250 may be stored in the memory 235. In addition, an algorithm required for the processor 250 to process the received biometric data of the user may be stored in the memory 235.

According to various embodiments, the communication module 240 may connect the electronic device 220 and the server 260 wirelessly or by wire. The communication module 240 may be controlled by a processor (e.g., a communication processor) different from a processor (e.g., an application processor) that processes the biometric data of the user received from the sensor module 230.

According to various embodiments, the processor 250 may include a data processing module 251 and a combining module 256 according to the order and/or method of processing the biometric data of the user 210 received from the sensor module 230. The data processing module 251 may include a first data processing module 252 and a second data processing module 253.

According to various embodiments, the biometric data of the user 210 received through the sensor module 230 may be input to the first data processing module 252 and the second data processing module 253 of the data processing module 251. The biometric data of the user 210 input to the first data processing module 252 and the second data processing module 253 may be the same data.

According to various embodiments, the first data processing module 252 may generate first data by processing the biometric data of the user 210 received from the sensor module 230. According to a further embodiment, the first data processing module 252 may generate first data by applying an algorithm to the received biometric data of the user. The algorithm for generating the first data may be the same algorithm as the algorithm applied to the biometric data of the user in the server 260. The algorithm for generating the first data may be received from the server 260. According to another embodiment, the first data processing module 252 may bypass the received biometric data of the user. For example, if the received biometric data of the user is generally exposed data such as the user's face, the electronic device 220 may transmit the received biometric data of the user to the server 260 through the communication module 240. According to another embodiment, the first data processing module 252 may generate the first data by encrypting (e.g., homomorphic encryption) the received biometric data of the user. The first data processing module 252 may generate first data by generating and encrypting feature points from a user's face image captured by a camera.

According to various embodiments, the second data processing module 253 may generate second data by processing the biometric data of the user 210 received from the sensor module 230. The second data processing module 253 may generate second data by applying an algorithm to the received biometric data of the user. The electronic device 220 may internally process and store the biometric data of the user for use. For example, the electronic device 220 may use the biometric data of the user to unlock the screen, and may apply an algorithm to process and store the biometric data of the user. The algorithm that the second data processing module 253 applies to the biometric data of the user 210 received from the sensor module 230 may be an algorithm developed or provided by the manufacturer of the electronic device 220.

According to still another embodiment, an algorithm applied to the biometric data of the user by the first data processing module 252 and an algorithm applied to biometric data of the user by the second data processing module 253 may be different from each other.

According to various embodiments, the combining module 256 may combine the second data generated by the second data processing module 253 and the authentication result transmitted from the server 260, and store the same. As a result of identifying the response message received from the server 260 and if it is identified to be valid, the combining module 256 may combine the generated second data and the received authentication result, and store the same. According to an embodiment, the combining module 256 may store the second data and the authentication result for a certain amount of time. The combining module 256 may receive information on the certain amount of time from the server 260. Alternatively, the certain amount of time may be a predetermined time (e.g., 1 minute, while the application is running). Alternatively, the combining module 256 may determine the certain amount of time based on the information on the certain amount of time received from the server 260 and the predetermined time. According to another embodiment, the combining module 256 may combine the second data and the authentication result and store them permanently.

Referring to FIG. 2, the server 260 may include at least some of a processor 275, a communication module 270, and a memory (not illustrated). The server 260 may further include a database 265.

According to various embodiments, the database 265 may store biometric data of the user registered in the server 260. The biometric data of the user stored in the database 265 may be data received through a sensor module (not illustrated) stored as it is, stored after being encrypted, or stored after being processed by an algorithm. According to an embodiment, the server 260 may obtain the biometric data of the user by including a sensor module identical or similar to the sensor module 230 included in the electronic device 220. According to another embodiment, the server 260 may receive the biometric data of the user from a device (e.g., a kiosk) including a separate sensor module. According to yet another embodiment, the biometric data of the user stored in the database 265 of the server 260 may be an image included in an identification card.

According to various embodiments, the communication module 270 may connect the server 260 and the electronic device 220 wirelessly or by wire. The communication module 270 may receive a message transmitted from the electronic device 220 or transmit a message to the electronic device 220. The communication module 270 may receive the biometric data of the user transmitted from the user 210 by using a web service or a kiosk.

According to various embodiments, the processor 275 may receive an authentication request message including the first data in which the biometric data of the user is processed from the electronic device 220 to compare the third data in which the biometric data of the user processed by the server 260 with the first data included in the authentication request message. According to a further embodiment, the server 260 and the electronic device 220 may apply the same algorithm to the biometric data of the user, and the server 260 may compare whether data to which the algorithm is applied by the electronic device 220 and data to which the algorithm is applied by the server 260 are the same. According to still another embodiment, the electronic device 220 may encrypt and transmit the biometric data of the user, and the processor 275 may encode the encrypted biometric data of the user. The processor 275 may apply the algorithm to the encoded biometric data of the user, and may also apply the same algorithm to the biometric data of the user received through another path (e.g., a kiosk or a web service). The processor 275 may compare the results of applying the same algorithm to the encoded biometric data of the user and the biometric data of the user received through another path. According to an embodiment, the electronic device 220 may bypass the biometric data of the user, and the processor 275 may apply an algorithm to the bypassed biometric data of the user. The processor 275 may compare the results of applying the same algorithm to the bypassed biometric data of the user and the biometric data of the user received through another path. According to another embodiment, the third data may be data generated by processing an image included in the identification card, and the processor 275 may determine whether to authenticate by using a unique value and a unique key together included in a chip in the identification card.

According to various embodiments, the processor 275 may transmit a response message by generating a key or token as a result of comparison between the first data and the third data and including the same in the response message. When the result of comparison between the first data and the third data is determined to be valid, the processor 275 may include the key or token in the response message and transmit the response message. When the result of comparison between the first data and the third data is determined to be invalid, the processor 275 may transmit an error message as a response message.

Figure 3:
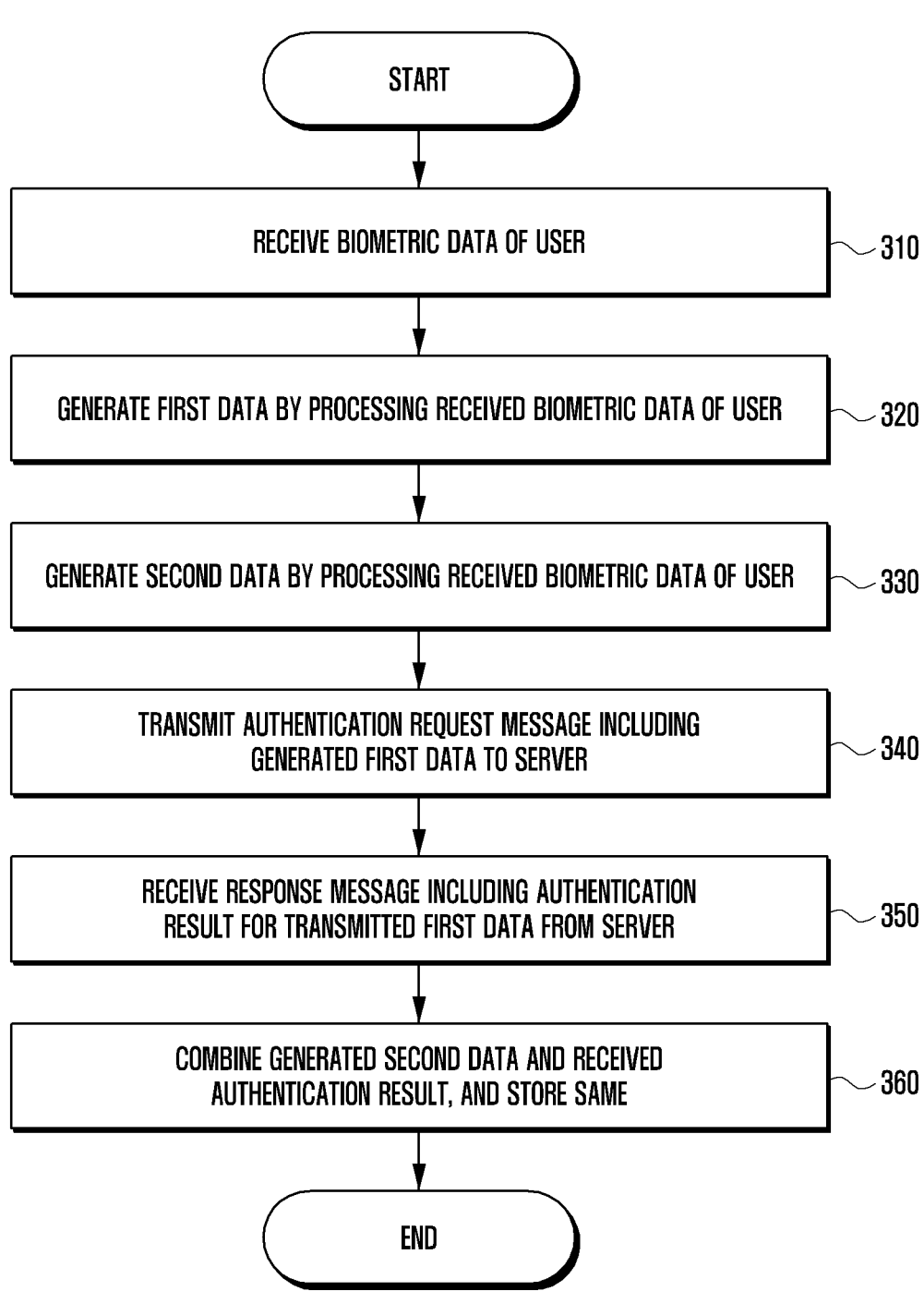
FIG. 3 is a flowchart of an electronic device according to an embodiment of the disclosure.

FIG. 3 is a flowchart of an electronic device according to an embodiment of the disclosure.

According to various embodiments, the electronic device (e.g., the electronic device 220 of FIG. 2) may receive biometric data of a user (e.g., the user 210 of FIG. 2) in operation 310. The biometric data of the user may be obtained through a sensor module (e.g., the sensor module 230 of FIG. 2) included in the electronic device 220. The biometric data of the user may be, for example, at least one of finger fingerprint data, iris data, face data, electrocardiogram data, retina pattern data, blood vessel pattern data, palm fingerprint data, and palm vein data.

According to various embodiments, in operation 320, the electronic device 220 may generate first data by processing the received biometric data of the user. According to another embodiment, the electronic device 220 may generate first data by applying an algorithm to the received biometric data of the user. The algorithm for generating the first data may be the same algorithm as the algorithm applied to the biometric data of the user in the server 260. The algorithm for generating the first data may be received from the server 260. According to another embodiment, the electronic device 220 may bypass the received biometric data of the user. For example, the electronic device 220 may bypass the data to the server 260 when the received biometric data of the user is generally exposed data such as the user's face. According to another embodiment, the electronic device 220 may generate first data by encrypting (e.g., homomorphic encryption) the received biometric data of the user. For example, the electronic device 220 may include a camera as the sensor module 230. The electronic device 220 may take a picture of the user's face by using a camera, and may generate first data by generating and encrypting feature points from the user's face image captured by the camera.

According to various embodiments, in operation 330, the electronic device 220 may generate second data by processing the received biometric data of the user. The electronic device 220 may store the biometric data of the user. The electronic device 220 may have an internally processed algorithm to store the biometric data of the user. For example, the algorithm internally processed by the electronic device 220 to store the biometric data of the user may be an algorithm developed or provided by a manufacturer of the electronic device 220. The electronic device 220 may generate second data by applying the internally processed algorithm to store the biometric data of the user to the received biometric data of the user. According to yet another embodiment, the algorithm used by the electronic device 220 to generate the first data and the algorithm used to generate the second data may be different from each other, so that the second data generated by processing the biometric data of the user may be different from the first data generated by processing the biometric data of the same user.

According to various embodiments, in operation 340, the electronic device 220 may transmit an authentication request message including the generated first data to the server 260. The electronic device 220 may transmit, to the server 260, the authentication request message including first data generated to identify whether the received biometric data of the user is valid. According to a further embodiment, the authentication request message may include a session-specific value and/or a token.

According to various embodiments, in operation 350, the electronic device 220 may receive a response message including an authentication result for the transmitted first data from the server 260. The authentication result may be included in the response message in the form of a key or token. The response message may further include at least one of an ID of the electronic device requesting authentication, an ID of an authentication authority, an authentication valid period, a user ID, an authentication time point, and a count. According to still another embodiment, when the biometric data of the user transmitted from the server 260 is identified to be valid, the electronic device 220 may receive a key value or token that may be used later. On the other hand, when the biometric data of the user transmitted from the server 260 is identified to be invalid, the electronic device 220 may receive an error message.

According to various embodiments, in operation 360, the electronic device 220 may combine the generated second data and the received authentication result, and store the same. As a result of identifying the response message received from the server 260 and if it is identified to be valid, the electronic device 220 may combine the generated second data and the received authentication result, and store the same. According to an embodiment, the electronic device 220 may store the second data and the authentication result for a certain amount of time. The electronic device 220 may receive information on the certain amount of time from the server 260. Alternatively, the certain amount of time may be a predetermined time (e.g., 1 minute, while the application is running). Alternatively, the electronic device 220 may determine the certain amount of time based on the information on the certain amount of time received from the server 260 and the predetermined time. According to another embodiment, the electronic device 220 may store the second data and the authentication result permanently.

Figure 4:
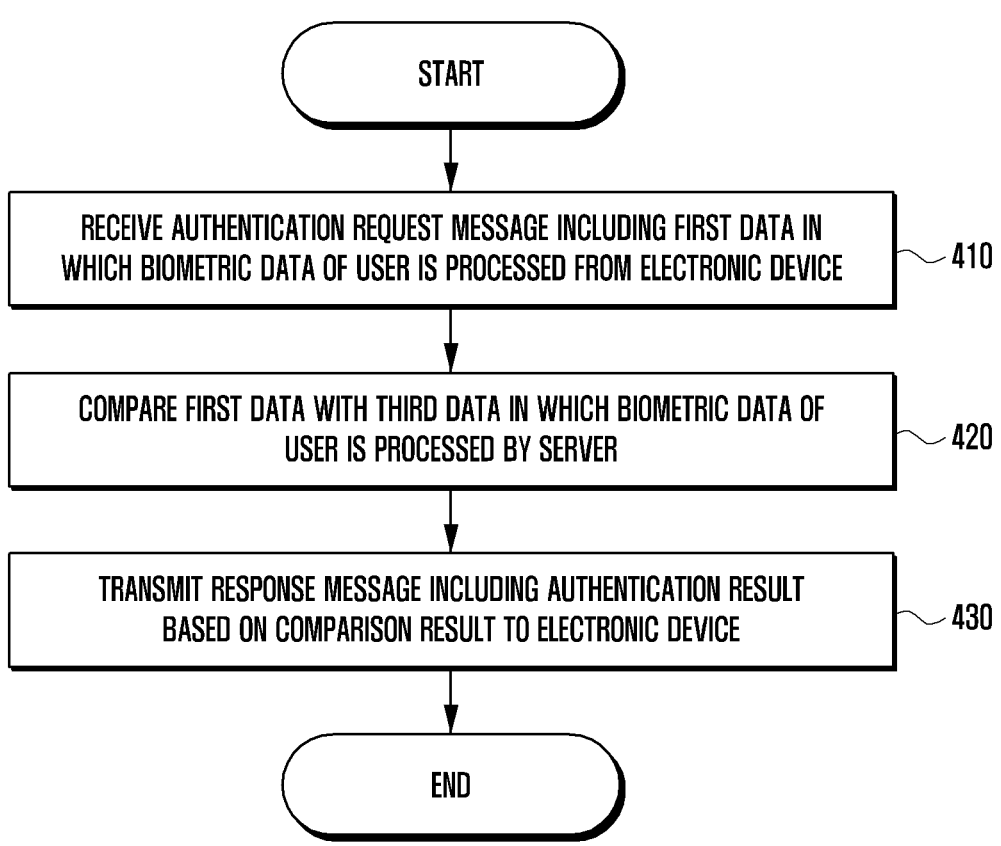
FIG. 4 is a flowchart of a server according to an embodiment of the disclosure.

FIG. 4 is a flowchart of a server according to an embodiment of the disclosure.

According to various embodiments, in operation 410, the server (e.g., the server 260 of FIG. 2) may receive, from an electronic device (e.g., the electronic device 220 of FIG. 2), an authentication request message including first data in which the biometric data of a user is processed. The authentication request message transmitted from the electronic device 220 may be a message requesting identification of whether the first data transmitted from being included in the authentication request message is valid. The authentication request message may include the biometric data of the user received by the electronic device 220 as it is, include the biometric data of the user encrypted, or include the biometric data of the user to which an algorithm is applied. The authentication request message may further include at least one of an ID of the electronic device 220 and information on the user, and may be transmitted.

According to various embodiments, the server 260 may receive the biometric data of the user directly transmitted from the user 210 in addition to the authentication request message transmitted from the electronic device 220. For example, the user 210 may transmit the biometric data of the user to the server 260 by using a web service or transmit the biometric data of the user to the server 260 by using a kiosk.

According to various embodiments, in operation 420, the server 260 may compare the first data with the third data in which the biometric data of the user is processed by the server 260. The server 260 may process the biometric data of the user received through another path (e.g., a kiosk or a web service). According to another embodiment, the server 260 may compare the third data, which is the processed biometric data of the user, with the first data transmitted from the electronic device 220. The server 260 and the electronic device 220 may apply the same algorithm to the biometric data of the user, and the server 260 may compare whether the two data are the same. According to yet another embodiment, the electronic device 220 may encrypt and transmit the biometric data of the user, and the server 260 may encode the encrypted biometric data of the user. The server 260 may apply an algorithm to the encoded biometric data of the user, and may also apply the same algorithm to the biometric data of the user received through another path (e.g., a kiosk or a web service). The server 260 may compare the results of applying the same algorithm to the encoded biometric data of the user and the biometric data of the user received through another path. According to a further embodiment, the electronic device 220 may bypass the biometric data of the user, and the server 260 may apply an algorithm to the bypassed biometric data of the user. The server 260 may compare the results of applying the same algorithm to the bypassed biometric data of the user and the biometric data of the user received through another path (e.g., a kiosk or a web service).

According to various embodiments, in operation 430, the server 260 may transmit a response message including an authentication result based on the comparison result to the electronic device 220. The server 260 may generate a key or token as the result of the comparison between the first data and the second data, include the same in the response message, and transmit the response message. According to still another embodiment, the key may be a private key or a public key. The server 260 may transmit the key and/or token when the comparison result is recognized as the same. When it is identified that the comparison result is different, the server 260 may transmit an error message to the electronic device 220 as a response message. According to an embodiment, the response message may further include at least one of an ID of the electronic device requesting authentication, an ID of an authentication authority, a user ID, an authentication valid period, an authentication time point, and a count as the authentication result.

Figure 5:
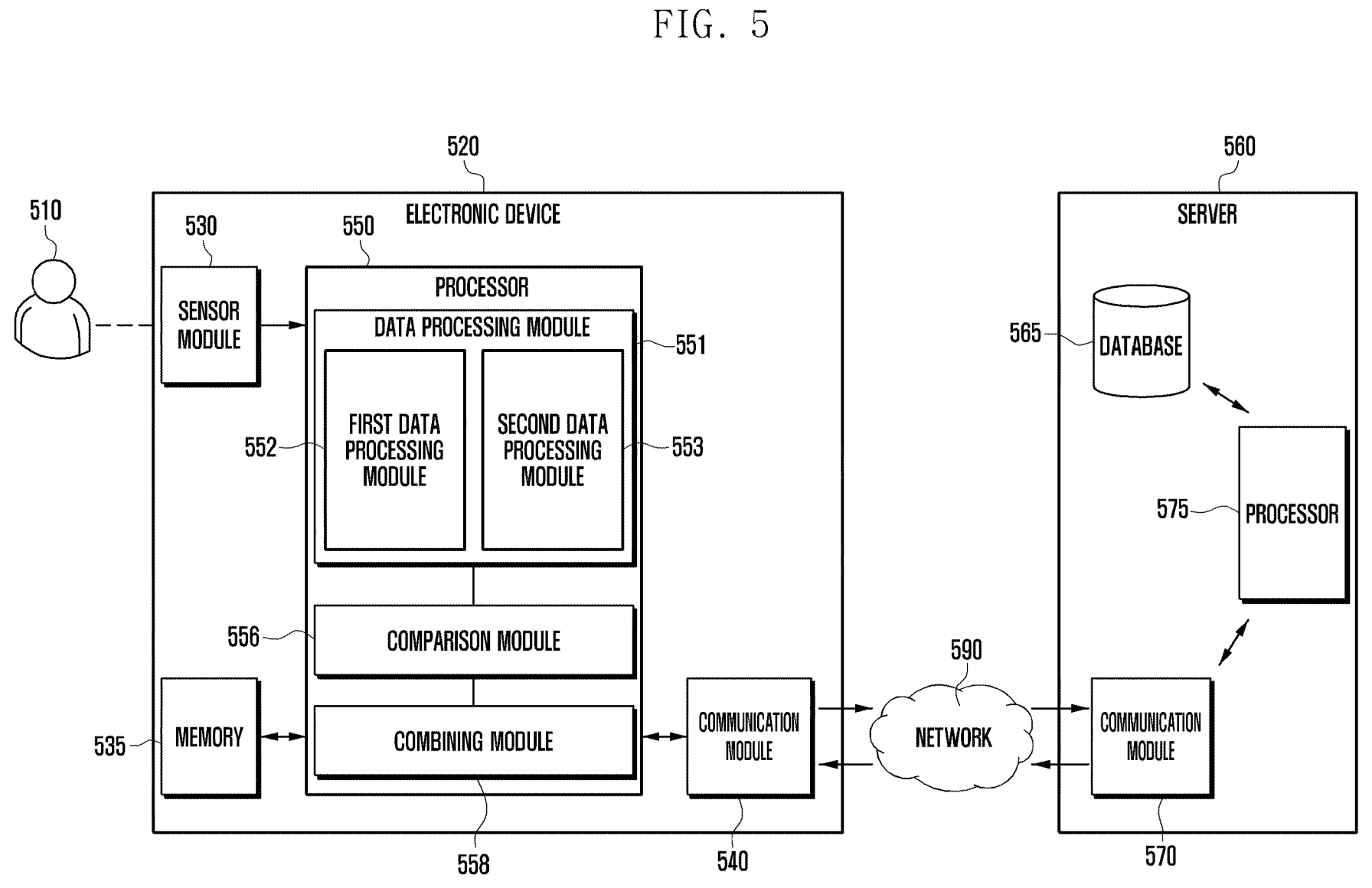

FIG. 5 is a block diagram of a system including an electronic device and a server according to an embodiment of the disclosure.

Referring to FIG. 5, the system may include an electronic device 520 (e.g., the electronic device 101 of FIG. 1) and a server 560 (e.g., the server 108 of FIG. 2) connected to the electronic device 520 through a network 590. The electronic device 520 of FIG. 5 may be an electronic device that stores the biometric data of the user before receiving the biometric data of the user to authenticate the user. The server 560 is an electronic device of a user authentication authority (e.g., a user ID card issuing authority) and may authenticate the biometric data of the user transmitted from the electronic device 520.

Referring to FIG. 5, the system may include the electronic device 520 (e.g., the electronic device 101 of FIG. 1) and the server 560 (e.g., the server 108 of FIG. 2) connected to the electronic device 520 through a network 590. The server 560 is an electronic device of a user authentication authority (e.g., a user ID card issuing authority) and may authenticate the biometric data of the user transmitted from the electronic device 520.

According to various embodiments, the sensor module 530 for obtaining biometric data from a user 510 may include at least some of a camera, an infrared sensor, and a fingerprint recognition sensor. The sensor module 530 may be used to convert the unique characteristics of a user's body into biometric data. According to yet another embodiment, a plurality of biometric data of a user may be obtained by a single sensor. For example, a camera (not illustrated) may be used to obtain an image of a user's body (face, palm pattern), and an infrared sensor may be used to obtain iris and blood vessel data. According to a further embodiment, a piece of biometric data of a user may be obtained in various ways by using various sensors. For example, fingerprints may be obtained by using a camera, or obtained by converting the curvature of the fingerprint measured by using capacitance into an image. In addition, biometric data of the user may be obtained from the finger, face, electrocardiogram, retina, blood vessels, and/or palm through the sensor module 530.

According to various embodiments, the memory 535 may store various data used by at least one component of the electronic device 520. For example, the biometric data of the user received from the sensor module 530, the authentication result received from the server 560, and the biometric data of the user processed by the processor 550 may be stored in the memory 535. In addition, an algorithm required for the processor 550 to process the received biometric data of the user may be stored in the memory 535.

According to various embodiments, the communication module 540 may connect the electronic device 520 and the server 560 wirelessly or by wire. The communication module 540 may be controlled by a processor (e.g., a communication processor) different from a processor (e.g., an application processor) that processes the biometric data of the user received from the sensor module 530.

According to various embodiments, the processor 550 may include a data processing module 551, a comparison module 556, and a combining module 558 according to the order and/or method of processing the biometric data of the user 510 received from the sensor module 530. The data processing module 551 may include a first data processing module 552 and a second data processing module 553.

According to various embodiments, the biometric data of the user 510 received through the sensor module 530 may be input to the first data processing module 552 and the second data processing module 553 of the data processing module 551. The biometric data of the user 510 input to the first data processing module 552 and the second data processing module 553 may be the same data.

According to various embodiments, the first data processing module 552 may generate first data by processing the biometric data of the user 510 received from the sensor module 530. According to still another embodiment, the first data processing module 552 may generate first data by applying an algorithm to the received biometric data of the user. The algorithm for generating the first data may be the same algorithm as the algorithm applied to the biometric data of the user in the server 560. The algorithm for generating the first data may be received from the server 560. According to another embodiment, the first data processing module 552 may bypass the received biometric data of the user. For example, if the received biometric data of the user is generally exposed data such as the user's face, the electronic device 520 may bypass the received biometric data of the user to the server 560. According to another embodiment, the first data processing module 552 may generate the first data by encrypting (e.g., homomorphic encryption) the received biometric data of the user. The first data processing module 552 may generate first data by generating and encrypting feature points from a user's face image captured by a camera.

According to various embodiments, the second data processing module 553 may generate second data by processing the biometric data of the user 510 received from the sensor module 530. The second data processing module 553 may generate second data by applying an algorithm to the received biometric data of the user. The electronic device 520 may internally process and store the biometric data of the user for use. For example, the electronic device 520 may use the biometric data of the user to unlock the screen, and may apply an algorithm to process and store the biometric data of the user. The algorithm that the second data processing module 553 applies to the biometric data of the user 510 received from the sensor module 530 may be an algorithm developed or provided by the manufacturer of the electronic device 520.

According to an embodiment, an algorithm applied to the biometric data of the user by the first data processing module 552 and an algorithm applied to the biometric data of the user by the second data processing module 553 may be different from each other.

According to various embodiments, the comparison module 556 may compare the second data with fourth data of the biometric data of the user stored in the electronic device 520. The comparison module 556 may compare the second data generated by processing the received biometric data of the user with the fourth data of the biometric data of the user stored in the electronic device 520. The fourth data of the biometric data of the user stored in the electronic device 520 may also be data generated by the method of generating the second data by the electronic device 520. The comparison module 556 may transmit a result of comparing the second data and the fourth data to the server 560 by controlling the communication module 540. The comparison module 556 may control the communication module 540 to transmit the result of comparing the second data and the fourth data together with the first data.

According to various embodiments, the combining module 558 may combine the second data generated by the second data processing module 553 and the authentication result transmitted from the server 560, and store the same. As a result of identifying the response message received from the server 560 and if it is identified to be valid, the combining module 558 may combine the generated second data and the received authentication result, and store the same. According to another embodiment, the combining module 558 may store the second data and the authentication result for a certain amount of time. The combining module 558 may receive information on the certain amount of time from the server 560. Alternatively, the certain amount of time may be a predetermined time (e.g., 1 minute, while the application is running). Alternatively, the combining module 558 may determine the certain amount of time based on the information on the certain amount of time received from the server 560 and the predetermined time. According to another embodiment, the combining module 558 may combine the second data and the authentication result and store them permanently.

Referring to FIG. 5, the server 560 may include at least some of a processor 575, a communication module 570, and a memory (not illustrated). The server 560 may further include a database 565.

According to various embodiments, as illustrated in FIG. 2, the database 565 may store biometric data of the user registered in the server 260. The biometric data of the user stored in the database 565 may be data received through a sensor module (not illustrated) stored as it is, stored after being encrypted, or stored after being processed by an algorithm. According to yet another embodiment, the server 560 may obtain the biometric data of the user by including a sensor module identical or similar to the sensor module 530 included in the electronic device 520. According to another embodiment, the server 560 may receive the biometric data of the user from a device (e.g., a kiosk) including a separate sensor module. According to a further embodiment, the biometric data of the user stored in the database 565 of the server 560 may be an image included in an identification card.

According to various embodiments, the communication module 570 may connect the server 560 and the electronic device 520 wirelessly or by wire. The communication module 570 may receive a message transmitted from the electronic device 520 or transmit a message to the electronic device 520. The communication module 570 may receive the biometric data of the user transmitted from the user 510 by using a web service or a kiosk.

According to various embodiments, the processor 575 may receive an authentication request message including the first data in which the biometric data of the user is processed from the electronic device 520, and further receive a result of comparing the biometric data of the user in the electronic device 520. The processor 575 may determine whether to authenticate based on the result of comparing the third data in which the biometric data of the user is processed by the server 560 with the first data and the comparison result received from the electronic device 520. According to still another embodiment, the third data may be data generated by processing an image included in the identification card, and the processor 575 may determine whether to authenticate by using the unique value/unique key together included in the chip in the ID card. The processor 575 may generate a response message including a result of determining whether to authenticate and transmit the response message to the electronic device 520.

According to various embodiments, the processor 575 may generate a key or token based on the comparison result between the first data and the third data and the received comparison result and include the key or token in the response message to transmit the response message. When the result of comparison between the first data and the third data is determined to be valid, the processor 575 may include the key or token in the response message and transmit the response message. When the result of comparison between the first data and the third data is determined to be invalid, the processor 575 may transmit an error message as a response message.

FIG. 6 is a flowchart of an electronic device according to an embodiment of the disclosure.

According to various embodiments, the electronic device (e.g., the electronic device 520 of FIG. 5) may have already stored the user's biometric information before receiving the biometric data of the user to request authentication. For example, the electronic device 520 may store user's biometric information in response to a request from a specific application (e.g., a bank application) or to unlock the locked electronic device 520. Information transmitted from the electronic device 520 to a server (e.g., the server 560 of FIG. 5) to request authentication may be different depending on whether the user's biometric information is stored before receiving the biometric data of the user.

According to various embodiments, the electronic device 520 may receive biometric data of a user in operation 610. The biometric data of the user may be obtained through a sensor module (e.g., the sensor module 530 of FIG. 5) included in the electronic device 520. The biometric data of the user may be, for example, at least one of finger fingerprint data, iris data, face data, electrocardiogram data, retina pattern data, blood vessel pattern data, palm fingerprint data, and palm vein data.

According to various embodiments, in operation 620, the electronic device 520 may generate first data by processing the received biometric data of the user. According to an embodiment, the electronic device 520 may generate the first data by applying an algorithm to the received biometric data of the user. The algorithm for generating the first data may be the same algorithm as the algorithm applied to the biometric data of the user in the server 560. The algorithm for generating the first data may be received from the server 560. According to another embodiment, the electronic device 520 may bypass the received biometric data of the user. For example, the electronic device 520 may bypass the received biometric data of the user to the server 560 when the received biometric data of the user is generally exposed data such as the user's face. According to another embodiment, the electronic device 520 may generate first data by encrypting (e.g., homomorphic encryption) the received biometric data of the user. For example, the electronic device 520 may include a camera as the sensor module 530. The electronic device 520 may take a picture of the user's face by using a camera, and may generate first data by generating and encrypting feature points from the user's face image captured by the camera.

According to various embodiments, in operation 630, the electronic device 520 may generate second data by processing the received biometric data of the user. The electronic device 520 may store the biometric data of the user. The electronic device 520 may have an internally processed algorithm to store the biometric data of the user. For example, the algorithm internally processed by the electronic device 520 to store the biometric data of the user may be an algorithm developed or provided by a manufacturer of the electronic device 520. The electronic device 520 may generate second data by applying the internally processed algorithm to store the biometric data of the user to the received biometric data of the user. According to another embodiment, the second data generated by processing the biometric data of the user may be different from the first data generated by processing the biometric data of the same user.

According to yet another embodiment, an algorithm for generating the first data may be different from an algorithm for generating the second data.

According to various embodiments, in operation 640, the electronic device 520 may transmit an authentication request message including the generated first data to the server 560. The electronic device 520 may transmit, to the server 560, the authentication request message including first data generated to identify whether the received biometric data of the user is valid.

According to various embodiments, in operation 650, the electronic device 520 may compare the second data with fourth data for the biometric data of the user stored in the electronic device 520. The electronic device 520 may compare the second data generated by processing the received biometric data of the user with the fourth data of the biometric data of the user stored in the electronic device 520. The fourth data of the biometric data of the user stored in the electronic device 520 may also be data generated by the method of generating the second data by the electronic device 520.

According to various embodiments, in operation 660, the electronic device 520 may transmit a result of comparing the second data with the fourth data to the server. Referring to FIG. 6, it is described that the electronic device 520 transmits the first data and the comparison result separately, but the first data and the comparison result may be included together in one message and transmitted. The electronic device 520 may transmit a message including a variable indicating the comparison result between the second data and the fourth data.

According to various embodiments, in operation 670, the electronic device 520 may receive a response message including the transmitted first data and an authentication result for the transmitted comparison result from the server 560. The server 560 may determine an authentication result based on a result of comparing the transmitted first data with third data, which is user biometric data processed by the server 560, and the transmitted comparison result, and transmit the determined authentication result to the electronic device 520.

According to various embodiments, in operation 680, the electronic device 520 may store the fourth data and the received authentication result. As a result of identifying the response message received from the server 560 and if it is identified to be valid, the electronic device 520 may further store the fourth data, which is the biometric data of the user stored in the electronic device 520, in combination with the received authentication result. According to a further embodiment, the electronic device 520 may store the fourth data and the authentication result for a certain amount of time. The electronic device 520 may receive information on the certain amount of time from the server 560. Alternatively, the certain amount of time may be a predetermined time (e.g., 1 minute, while the application is running). Alternatively, the electronic device 520 may determine the certain amount of time based on the information on the certain amount of time received from the server 560 and the predetermined time. According to still another embodiment, the electronic device 520 may store the fourth data and the authentication result permanently.

Figure 7:
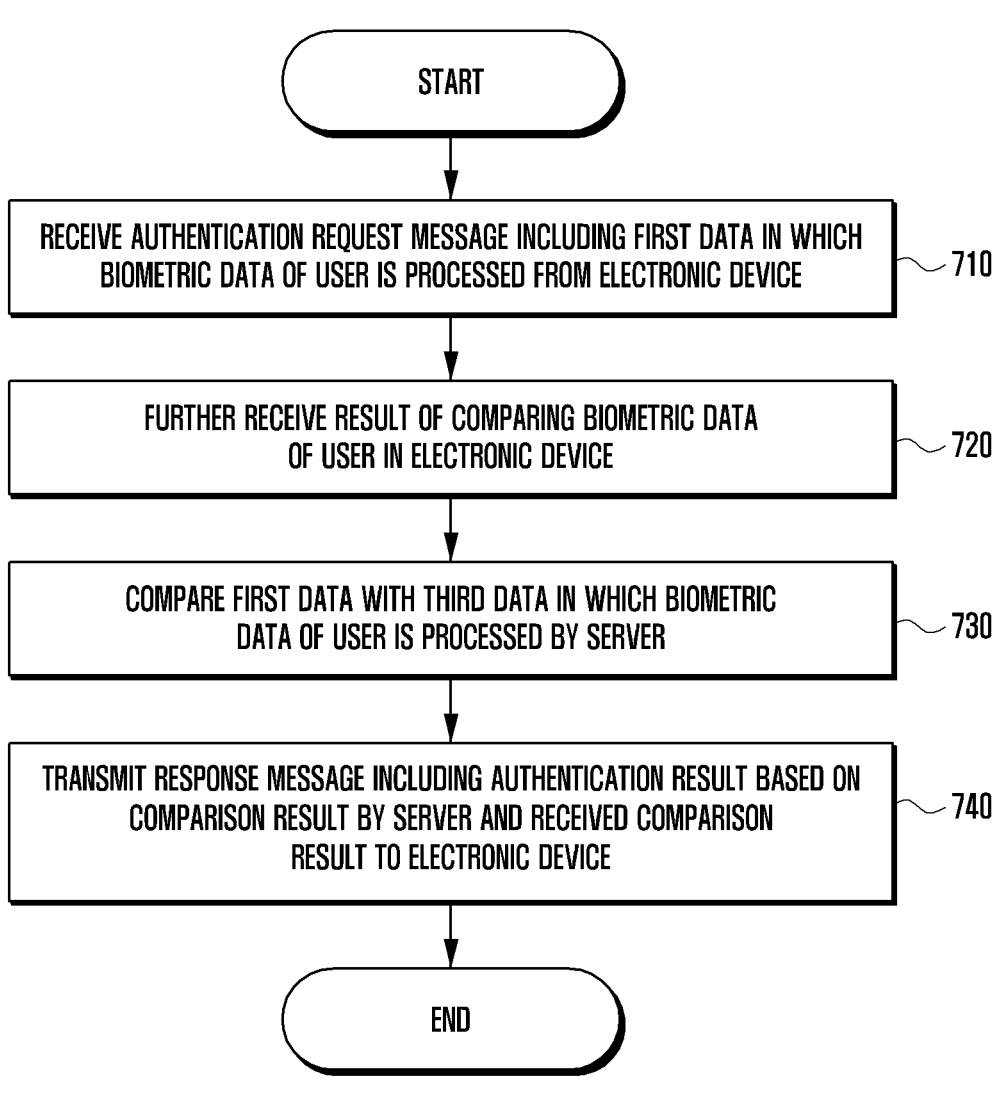
FIG. 7 is a flowchart of a server according to an embodiment of the disclosure.

FIG. 7 is a flowchart of a server according to an embodiment of the disclosure.

According to various embodiments, the server (e.g., the server 560 of FIG. 5) may receive an authentication request message from an electronic device (e.g., the electronic device 520 of FIG. 5) in which biometric information of the user is already stored. The information transmitted from the electronic device 520 in which the user's biometric information is already stored to the server 560 for authentication may be different from information transmitted to the server for authentication from the electronic device 520 in which the user's biometric information is not stored.

According to various embodiments, in operation 710, the server 560 may receive, from the electronic device 520, an authentication request message including first data in which the biometric data of a user is processed. The authentication request message transmitted from the electronic device 520 may be a message requesting identification of whether the first data transmitted from being included in the authentication request message is valid. The authentication request message may include the biometric data of the user received by the electronic device 520 as it is, include the biometric data of the user encrypted, or include the biometric data of the user to which an algorithm is applied. The authentication request message may further include at least one of an ID of the electronic device 520 and information on the user, and may be transmitted.

According to various embodiments, in operation 720, the server 560 may further receive a result of comparing biometric data of the user in the electronic device 520. The electronic device 520 may store user's biometric information for various reasons. For example, because a specific application may request the user's biometric information to authenticate the user, the electronic device 520 may store the user's biometric information. As another example, the electronic device 520 may store the user's biometric information to unlock the electronic device 520. The electronic device 520 may further transmit a result of comparing the received biometric data of the user with the biometric data of the user stored in the electronic device 520. According to an embodiment, the server 560 may identify whether the transmitted data is valid by identifying the comparison result. According to another embodiment, if the identified comparison result is the same, the server 560 may perform operation 730.

According to various embodiments, the server 560 may receive the biometric data of the user directly transmitted from the user 510 in addition to the authentication request message transmitted from the electronic device 520. For example, the user 510 may transmit the biometric data of the user to the server 560 by using a web service or transmit the biometric data of the user to the server 560 by using a kiosk.

According to various embodiments, in operation 730, the server 560 may compare the first data with the third data in which the biometric data of the user is processed by the server 560. The server 560 may process the biometric data of the user received through another path (e.g., a kiosk or a web service). According to yet another embodiment, the server 560 may compare the third data, which is the processed biometric data of the user, with the first data transmitted from the electronic device 520. The server 560 and the electronic device 520 may apply the same algorithm to the biometric data of the user, and the server 560 may compare whether the two data are the same. According to a further embodiment, the electronic device 520 may encrypt and transmit the biometric data of the user, and the server 560 may encode the encrypted biometric data of the user. The server 560 may apply an algorithm to the encoded biometric data of the user, and may also apply the same algorithm to the biometric data of the user received through another path. The server 560 may compare the results of applying the same algorithm to the encoded biometric data of the user and the biometric data of the user received through another path. According to still another embodiment, the electronic device 520 may bypass the biometric data of the user, and the server 560 may apply an algorithm to the bypassed biometric data of the user. The server 560 may compare the results of applying the same algorithm to the bypassed biometric data of the user and the biometric data of the user received through another path.

According to various embodiments, in operation 740, the server 560 may transmit a response message including the comparison result in operation 730 and the authentication result based on the comparison result received from the electronic device 520 to the electronic device 520. When both comparison results are the same, the server 560 may include an authentication result indicating that authentication is valid and transmit the response message. The authentication result indicating that authentication is valid may be generated as a key or token. The server 560 may transmit a response message including a key or token to the electronic device 520 if authentication is valid, and may transmit an error message as a response message if authentication is invalid.

An electronic device according to various embodiments of the disclosure may include a sensor module, a communication module, and a processor that receives biometric data of a user by using, and the sensor module, processes the received biometric data of the user to generate first data, processes the received biometric data of the user to generate second data, controls the communication module to transmit, to a server, an authentication request message including the generated first data, controls the communication module to receive, from the server, a response message including an authentication result for the transmitted first data, and combines the generated second data and the received authentication result and store the same, and the first data and the second data may be data generated by applying different algorithms.

In the electronic device according to various embodiments of the disclosure, the biometric data of the user may be at least one of a fingerprint, an iris, a face, an electrocardiogram, a retinal pattern, a blood vessel pattern, and a palm pattern.

In the electronic device according to various embodiments of the disclosure, if the authentication result is valid, the response message may include at least one of a key or a token.

In the electronic device according to various embodiments of the disclosure, the first data may be data obtained by encrypting the received biometric data.

The processor of the electronic device according to various embodiments of the disclosure may identify whether there is biometric data registered in the electronic device, compare the registered biometric data with the second data if there is the registered biometric data, and control the communication module to further transmit the comparison result to the server.

The processor of the electronic device according to various embodiments of the disclosure may identify whether there is biometric data registered in the electronic device, compare the registered biometric data with the second data if there is the registered biometric data, and control the communication module to transmit the comparison result to the server if it is determined that the compared data are the same.

In the electronic device according to various embodiments of the disclosure, the biometric data may be a face image of the user, and the server may be a device for authenticating the user by using an image included in the user's identification card.

The processor of the electronic device according to various embodiments of the disclosure may control permission for the electronic device based on the authentication result.

A server according to various embodiments of the disclosure may include a communication module and a processor that controls the communication module to receive, from an electronic device, an authentication request message including first data in which biometric data of a user is processed, compares second data in which biometric data of a user is processed by a server with the first data, and controls the communication module to transmit, to the electronic device, a response message including an authentication result based on the comparison result.

The processor of the server according to various embodiments of the disclosure may control the communication module to further receive, from the electronic device, a result of comparing the biometric data of the user in the electronic device, and the response message may include an authentication result further considering the received comparison result.

An operation method of an electronic device according to various embodiments of the disclosure may include receiving biometric data of a user, processing the received biometric data of the user to generate first data, processing the received biometric data of the user to generate second data, transmitting an authentication request message including the generated first data to a server, receiving a response message including an authentication result for the transmitted first data from the server, and combining the generated second data and the received authentication result and storing the same, and the first data and the second data may be data generated by applying different algorithms.

In the operation method of the electronic device according to various embodiments of the disclosure, the biometric data of the user may be at least one of a fingerprint, an iris, a face, an electrocardiogram, a retinal pattern, a blood vessel pattern, and a palm pattern.

In the operation method of the electronic device according to various embodiments of the disclosure, if the authentication result is valid, the response message may include at least one of a key or a token.

In the operation method of the electronic device according to various embodiments of the disclosure, the first data may be data obtained by encrypting the received biometric data.

The operation method of the electronic device according to various embodiments of the disclosure may further include identifying whether there is biometric data registered in the electronic device, comparing the registered biometric data with the second data if there is the registered biometric data, and transmitting the comparison result to the server.

The operation method of the electronic device according to various embodiments of the disclosure may further include identifying whether there is biometric data registered in the electronic device, comparing the registered biometric data with the second data if there is the registered biometric data, and transmitting the comparison result to the server if it is determined that the compared data are the same.

In the operation method of the electronic device according to various embodiments of the disclosure, the biometric data may be a face image of the user, and the server may be a device for authenticating the user by using an image included in the user's identification card.

An operation method of a server according to various embodiments of the disclosure may include receiving an authentication request message including first data in which biometric data of a user is processed from an electronic device, comparing second data in which biometric data of a user is processed by a server with the first data, and transmitting a response message including an authentication result based on the comparison result to the electronic device.

An operation method of a server according to various embodiments of the disclosure may further include receiving, from the electronic device, a result of comparing the biometric data of the user in the electronic device, and the response message may include an authentication result further considering the received comparison result.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to another embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to yet another embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a sensor;
a communication circuit;
memory storing instructions; and
one or more processors communicatively coupled to the sensor, the communication circuit, and the memory,
wherein the instructions, when executed by the one or more processors individually or collectively, cause the electronic device to:
receive, through the sensor, biometric data of a user,
process the biometric data of the user to generate first data by applying a first algorithm to the biometric data of the user, the first data being used for identification verification of the user,

process the biometric data of the user to generate second data by applying a second algorithm to the biometric data of the user, the second data being used for unlocking the electronic device,
transmit, through the communication circuit to a server, an authentication request message comprising the first data,
receive, through the communication circuit from the server, a response message comprising an authentication result for the first data, and
combine the authentication result for the first data with the second data, and store the combined data,
wherein the first algorithm is different from the second algorithm, and
wherein the authentication result is used to link an unlocking function of the electronic device with identification verification of the user.

2. The electronic device of claim 1, wherein the biometric data of the user comprises at least one of a fingerprint, an iris, a face, an electrocardiogram, a retinal pattern, a blood vessel pattern, and a palm pattern.

3. The electronic device of claim 1, wherein, in case that the authentication result is valid, the response message comprises at least one of a key or a token.

4. The electronic device of claim 1, wherein the first data is data obtained by encrypting the biometric data.

5. The electronic device of claim 1, wherein the instructions, when executed by the one or more processors individually or collectively, further cause the electronic device to:
identify whether there is biometric data registered in the electronic device;
compare the registered biometric data with the second data in case that there is the registered biometric data; and
transmit, to the server, a result of the comparing.

6. The electronic device of claim 1, wherein the instructions, when executed by the one or more processors individually or collectively, further cause the electronic device to:
identify whether there is biometric data registered in the electronic device;
compare the registered biometric data with the second data in case that there is the registered biometric data; and
transmit, to the server, a result of the comparing in case that it is determined that the registered biometric data and the second data are same.

7. The electronic device of claim 1,
wherein the biometric data comprises a face image of the user, and
wherein the server is a device for authenticating the user by using an image included in an identification card of the user.

8. An operation method performed by an electronic device, the operation method comprising:
receiving, through a sensor, biometric data of a user;
processing the biometric data of the user to generate first data by applying a first algorithm to the biometric data of the user, the first data being used for identification verification of the user;
processing the biometric data of the user to generate second data by applying a second algorithm to the biometric data of the user, the second data being used for unlocking the electronic device;
transmitting, to a server, an authentication request message comprising the first data;

receiving, from the server, a response message comprising an authentication result for the first data; and combining the authentication result for the first data with the second data, and storing the combined data, wherein the first algorithm is different from the second algorithm, and wherein the authentication result is used to link an unlocking function of the electronic device with identification verification of the user.

9. The operation method of claim 8, wherein the biometric data of the user is at least one of a fingerprint, an iris, a face, an electrocardiogram, a retinal pattern, a blood vessel pattern, and a palm pattern.

10. The operation method of claim 8, wherein, in case that the authentication result is valid, the response message comprises at least one of a key or a token.

11. The operation method of claim 8, wherein the first data is data obtained by encrypting the biometric data.

* * * * *